(12) United States Patent
Mielke et al.

(10) Patent No.: US 12,510,883 B2
(45) Date of Patent: Dec. 30, 2025

(54) METHOD AND SYSTEM FOR MANAGING REPORTS OF AN AUTOMATION SYSTEM, MORE PARTICULARLY AN INDUSTRIAL PLANT

(71) Applicant: Siemens Energy Global GmbH & Co. KG, Bayern (DE)

(72) Inventors: Jürgen Mielke, Bamberg (DE); Engelbert Schrapp, Sollentuna (SE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 492 days.

(21) Appl. No.: 17/442,805

(22) PCT Filed: Mar. 12, 2020

(86) PCT No.: PCT/EP2020/056649
§ 371 (c)(1),
(2) Date: Sep. 24, 2021

(87) PCT Pub. No.: WO2020/200687
PCT Pub. Date: Oct. 8, 2020

(65) Prior Publication Data
US 2022/0187800 A1 Jun. 16, 2022

(30) Foreign Application Priority Data
Mar. 29, 2019 (EP) .................... 19000158

(51) Int. Cl.
*G05B 19/418* (2006.01)
*G06F 18/214* (2023.01)

(52) U.S. Cl.
CPC ..... *G05B 19/4185* (2013.01); *G05B 19/4183* (2013.01); *G05B 19/4188* (2013.01); *G06F 18/214* (2023.01)

(58) Field of Classification Search
CPC ............ G05B 19/4185; G05B 19/4183; G05B 19/4188; G05B 23/0272; G06F 18/214
See application file for complete search history.

(56) References Cited

U.S. PATENT DOCUMENTS

| 6,701,195 B2 | 3/2004 | Brown |
| 2004/0260922 A1 | 12/2004 | Goodman |

(Continued)

FOREIGN PATENT DOCUMENTS

| CN | 101242549 A | 8/2008 |
| CN | 105955951 A | 9/2016 |

(Continued)

OTHER PUBLICATIONS

PCT International Search Report and Written Opinion of International Searching Authority mailed Jun. 22, 2020 corresponding to PCT International Application No. PCT/EP2020/056649 filed Dec. 3, 2020.

(Continued)

*Primary Examiner* — Thomas C Lee
*Assistant Examiner* — Tyler Dean Hedrick
(74) *Attorney, Agent, or Firm* — Wolter Van Dyke Davis, PLLC

(57) ABSTRACT

To manage reports of an automation system, which has a reporting system for generating reports and at least one first human-machine interface on which the reports are displayed, wherein the reporting system is communicatively connected to the human-machine interface, at least one first category and a second category of reports are defined and the reports of the automation systems are each assigned to at least one of the two categories. A function is applied at least to input data that represents reports assigned to the second category and displayed on the first human-machine interface. The function was trained by an algorithm from the field (Continued)

of machine learning and generates output data that represents a report of the automation system assigned to the first category. The report represented by the output data is displayed on a second human-machine interface, the second human-machine interface being communicatively disconnected from the reporting system.

17 Claims, 3 Drawing Sheets

(56) References Cited

U.S. PATENT DOCUMENTS

| | | | |
|---|---|---|---|
| 2008/0079558 A1 | 4/2008 | Dorgelo et al. | |
| 2008/0126996 A1* | 5/2008 | Morris | G06F 3/0482 |
| | | | 715/854 |
| 2011/0010654 A1* | 1/2011 | Raymond | G06N 5/025 |
| | | | 707/754 |
| 2012/0036016 A1 | 2/2012 | Hoffberg | |
| 2012/0149342 A1* | 6/2012 | Cohen | H04L 51/226 |
| | | | 455/412.2 |
| 2013/0254878 A1* | 9/2013 | Clarke | H04L 63/04 |
| | | | 726/22 |
| 2015/0223033 A1* | 8/2015 | Migicovsky | H04W 8/183 |
| | | | 455/412.2 |
| 2016/0098018 A1 | 4/2016 | Van Camp | |
| 2017/0206721 A1 | 7/2017 | Koo | |
| 2017/0300545 A1* | 10/2017 | Lee | G06F 8/34 |
| 2018/0046149 A1 | 2/2018 | Ahmed | |
| 2018/0046934 A1 | 2/2018 | Aravkin | |
| 2020/0379951 A1* | 12/2020 | Donaldson | G06F 16/17 |

FOREIGN PATENT DOCUMENTS

| | | |
|---|---|---|
| CN | 106548230 A | 3/2017 |
| CN | 107427268 A | 12/2017 |
| CN | 107430387 A | 12/2017 |
| CN | 107430715 A | 12/2017 |
| EP | 1906289 A1 | 4/2008 |
| WO | 0036476 A1 | 6/2000 |
| WO | 2005015326 A1 | 2/2005 |
| WO | 2016144587 A1 | 9/2016 |

OTHER PUBLICATIONS

Duan Xiangwen, Research and realization on adaptive framework for false alarms reduction, Application Research of Computers, 2009, 2141-2144, 26(6), ISSN: 1001-3695.2009.06.043. [English abstract on p. 1].

* cited by examiner

METHOD AND SYSTEM FOR MANAGING REPORTS OF AN AUTOMATION SYSTEM, MORE PARTICULARLY AN INDUSTRIAL PLANT

CROSS REFERENCE TO RELATED APPLICATIONS

This application is the US National Stage of International Application No. PCT/EP2020/056649 filed 12 Mar. 2020, and claims the benefit thereof. The International Application claims the benefit of European Application No. EP19000158 filed 29 Mar. 2019. All of the applications are incorporated by reference herein in their entirety.

FIELD OF INVENTION

The invention relates to a method and a system for managing reports of an automation system, in particular of an industrial installation, as claimed. The invention furthermore relates to an evaluation method and an evaluation system as claimed, and to a program and a computer program product as claimed.

BACKGROUND OF INVENTION

Automation systems serve for the monitoring, control, and/or regulation of mobile and stationary devices and installations and enable control devices, sensors, machines and industrial installations to be operated in a manner that is intended to be effected as autonomously and independently of human interventions as possible.

Automation systems are used for example in the field of industrial production, energy generation and distribution, building management, logistics, drive technology, etc. They often generate a multiplicity of reports for e.g. operating and maintenance personnel of the system. These reports are displayed to the personnel usually on a human-machine interface (HMI), e.g. an operator station, a PC or a portable device capable of communication, such as e.g. a tablet or smartphone. They are intended to direct the attention of the personnel to changes in the state of the device or installation which possibly require intervention on the part of the personnel.

These reports often relate to specific events in the automation system. A report can be for example an alarm report or an advice report. An alarm report is a report that a fault or an abnormal event has occurred and the personnel must initiate measures promptly. An advice report may advise of a need for maintenance, for example. In this case, the event report may comprise text and further information such as e.g. time and location of the generation of the report.

The reports are usually generated by a reporting system that is connected to the human-machine interface (HMI) communicatively, e.g. via a communication network.

Industrial installations are used in a wide variety of industrial sectors, for example in energy generation, process industry (e.g. paper, chemicals, pharmaceuticals, metal, oil and gas) and discrete manufacturing industry. In this case, the actual sector-specific process, e.g. energy generation or production process, is controlled and/or regulated by the automation system. An automation system without the field devices (i.e. without actuators and sensors) is often also referred to as a "process control system".

The reporting system is then often realized as a function in a so-called "operator system server" or "application server", in which one or more installation-specific application programs are stored and are executed during the operation of the installation.

In a complex industrial installation (e.g. a paper mill), under certain circumstances, hundreds of reports per minute are generated by the reporting system. Many of the reports are indeed important in order to indicate a possible anomaly, but not all of the reports have the same effect on the operation of the process. In this regard, it can happen that the operator of the installation is inundated with alarm reports and as a result is not able to react appropriately to the alarms that are really important. Sometimes up to 80% of the reports may actually be ignored by the operating/observation personnel, but extracting the important reports that may be critical for the installation requires many years of experience. Even if the operator extracts an important alarm very quickly, there is however often too little time remaining for suitable countermeasures. This may result in shutdown of the installation and production outages.

To cope with the flood of reports, some solution approaches are already known. In this regard, for example, EP 3 187 950 A1 discloses a method for managing alarms in a control system for an industrial process. The control system comprises a reporting system with a notification server for generating alarm reports on the basis of predefined notification generating criteria, an operator station, which is in communication with the server, and a database with historical alarm data. In that case, historical alarm data are received in the notification server, and a first group of alarms is defined as "important alarms" and a second group of alarms is defined as "less important alarms" on the basis of predefined rules. A multiplicity of historical data segments are identified in the historical alarm data, wherein each of said data segments includes at least one alarm message of an alarm of the first group. Furthermore, a multiplicity of association scores regarding the multiplicity of alarms of the second group are determined, and, finally, a predefined notification generating criterion for the alarms is modified on the basis of the multiplicity of association scores. Less important alarms of the second group are prioritized or suppressed by modification of the notification generation. Moreover, on the basis of the association scores of the less important alarms of the second group, important alarms of the first group can be predicted together with an assumed time period in which they occur.

Moreover, it is also known to use neural networks for predicting alarms or an imminent failure of components.

The known systems are directed primarily at changes in the rules for the generation of the alarms, i.e. at changes in the reporting system itself. Often, however, an operator of an automation system has no opportunity at all to intervene in the alarm system or in the rules thereof. Even if the operator has such an opportunity for intervention, this intervention is complex and susceptible to errors, however, and there is the risk of (possibly safety-relevant) reactions affecting the rest of the automation system. This holds true primarily even if the notification server is situated remotely from the installation in a cloud and is connected to the automation system via a public communication network.

SUMMARY OF INVENTION

It is therefore an object of the present invention to specify a method and a system for managing reports of an automation system, in particular of an industrial installation, with which the abovementioned disadvantages and problems can be avoided.

This object is achieved by means of a method and a system for managing reports of an automation system, in particular of an industrial installation, as claimed. An evaluation method and an evaluation system therefor are the subject matter of certain patent claims. A program and a computer program product are the subject matter of other patent claims. The dependent claims each relate to advantageous configurations.

The method according to the invention proceeds from an automation system which comprises—a reporting system for generating reports and—at least one first human-machine interface on which the reports are displayed, and wherein—the reporting system is connected to the human-machine interface communicatively, in particular via a communication network of the automation system,—at least one first category and a second category of reports are defined, and wherein the reports of the automation system are each assigned to at least one of the two categories,—a function is applied at least to input data which represent reports which are assigned to the second category (optionally additionally also those assigned to the first category) and which are displayed on the first human-machine interface, wherein the function was trained by an algorithm from the field of machine learning, and wherein output data, which represent a report of the automation system which is assigned to the first category, are generated as a result,—the report which is represented by the output data is displayed on a second human-machine interface, wherein the second human-machine interface is communicatively disconnected from the reporting system.

In the first step, the invention is based on the insight that, firstly, machine learning is used beneficially for filtering reports of the first category from the large quantity of reports (i.e. at least the quantity of reports of the second category, optionally additionally also the reports of the first category). In this case, the output data represent one of the reports which is also already represented by the input data within a defined time period. Secondly, machine learning can be used for predicting reports of the first category on the basis of at least the quantity of reports of the second category, optionally additionally also the reports of the first category. In this case, the output data generally represent a report which is not yet represented by the input data within a defined time period. However, they can also represent a report which is also already represented by the input data within a defined time period. With the aid of the filtered or predicted reports, the attention of personnel can be directed to the reports that are important under defined or definable criteria, or the occurrence of said reports can even be predicted.

Preferably, in the case of a prediction of a report, the output data comprise a point in time or a time period for an occurrence of the report and a probability of an occurrence of the report at said point in time or in said time period.

The different categories can advantageously express how critical the respective type of report is for the fail-safe reliability of the installation. However, the different categories can also relate to other aspects such as e.g. production costs, production quantity, production quality, consumption of raw materials, power consumption, emissions, etc.

Continuous machine-based training of the function taking account of current states of the installation is possible in this case. As a result, the function and thus the filtering and/or prediction of reports can be continuously adapted to changes in the installation (e.g. on account of wear or changes in the performance of installation components, changes in qualities/quantities of the raw materials, changes in the modes of operation of the installation) and a high quality of the filtering and/or prediction can thus be achieved.

In this case, intervention in the reporting system is neither provided nor necessary, rather the report which is represented by the output data is merely displayed in addition to the reports of the reporting system. As a result of this report being displayed on the separate, additional second human-machine interface and the second human-machine interface being communicatively disconnected from the reporting system or the automation system, it is possible to avoid undesired safety-relevant reactions affecting the automation system.

The communicative disconnection can be realized particularly simply by virtue of the fact that the input data of the function are received from a transmitter and the output data of the function are provided to a receiver, which is different than the transmitter.

The function which was trained by an algorithm from the field of machine learning can be provided by:—receiving input training data representing reports of the automation system,—receiving output training data representing reports of the automation system, wherein the output training data are related to the input training data,—training the function on the basis of the input training data and the output training data.

As a result of the training of the function on the basis of training data, the function can adapt to new circumstances and identify and extrapolate patterns in the reports. Parameters of the function can be adapted by training. By way of example, supervised training, semi-supervised training, unsupervised training, reinforcement learning and/or active training can be used in this case. Furthermore, representation learning (an alternative designation is "feature learning") can be used. In particular, the parameters of the function can be adapted iteratively by means of a plurality of training steps.

The function is advantageously based on cross-correlation of reports, a neural network (advantageously long/short term memory—LSTM) or on association rules. A combination of these methods is advantageously used, wherein the result can be obtained e.g. by way of the sum of the results of all the methods, by way of majority results, by way of individual results, etc.

In accordance with a further advantageous configuration, information about a quality of the report which is represented by the output data is acquired by the second human-machine interface and is used for training the function. This enables the function to be optimized particularly rapidly.

Furthermore, personnel of the device or installation can also be offered a selection from a plurality of predefined categorizations via the second human-machine interface and information about the selection can then be acquired via the second human-machine interface. Possible categorizations may be e.g. fail-safe reliability, emissions, power consumption, production costs, etc.

Advantageously, the function is arranged remotely from the reporting system, in particular on a cloud-based computer system. There, training data which represent reports of other automation systems can then also be acquired and used for training the function. The quality of the function and thus of the output data can thereby be increased.

A system according to the invention for managing reports of an automation system, in particular of an industrial installation, wherein the automation system comprises—a reporting system for generating reports, and—at least one first human-machine interface for displaying the reports,—wherein the reporting system is connected to the human-machine interface communicatively, in particular via a communication network of the automation system, and wherein at least one first category and a second category of the reports are defined and wherein the reports of the automation system are each assigned to at least one of the two categories categorized by—an evaluation unit configured for applying a function at least to input data which are displayed on the first human-machine interface and which represent reports which are assigned to the second category (optionally additionally also those assigned to the first category), wherein the function was trained by an algorithm from the field of machine learning, and wherein output data, which represent a report of the automation system which is assigned to the first category, are generated as a result,—a second human-machine interface for displaying the report which is represented by the output data, wherein the second human-machine interface is communicatively disconnected from the reporting system.

Advantageously, the system according to the invention comprises—a first interface configured for receiving the input data from a transmitter,—a second interface configured for providing the output data to a receiver, which is different than the transmitter.

In accordance with a further advantageous configuration, the system according to the invention comprises a training unit for providing the trained function, comprising—a first training interface configured for receiving input training data representing reports of the automation system,—a second training interface configured for receiving output training data representing reports of the automation system, wherein the output training data are related to the input training data,—a training computing unit configured for training the function on the basis of the input training data and the output training data,—a third training interface configured for providing the trained function.

In accordance with a further advantageous configuration, the second human-machine interface is configured for acquiring information about a quality of the report which is represented by the output data, and for transmitting said information to the training unit.

Particularly advantageously, the evaluation unit, advantageously the training unit as well, is arranged remotely from the reporting system, in particular on a cloud-based computer system.

The effects and advantages mentioned for the method according to the invention and for the advantageous configurations of said method apply, mutatis mutandis, to the system according to the invention and to the advantageous configurations of said system.

BRIEF DESCRIPTION OF THE DRAWINGS

The invention and further advantageous configurations of the invention in accordance with features of the dependent claims are explained in greater detail below on the basis of exemplary embodiments in the figures, in which mutually corresponding parts are provided with identical reference signs in each case. In the figures:

DETAILED DESCRIPTION OF INVENTION

Figure 1:
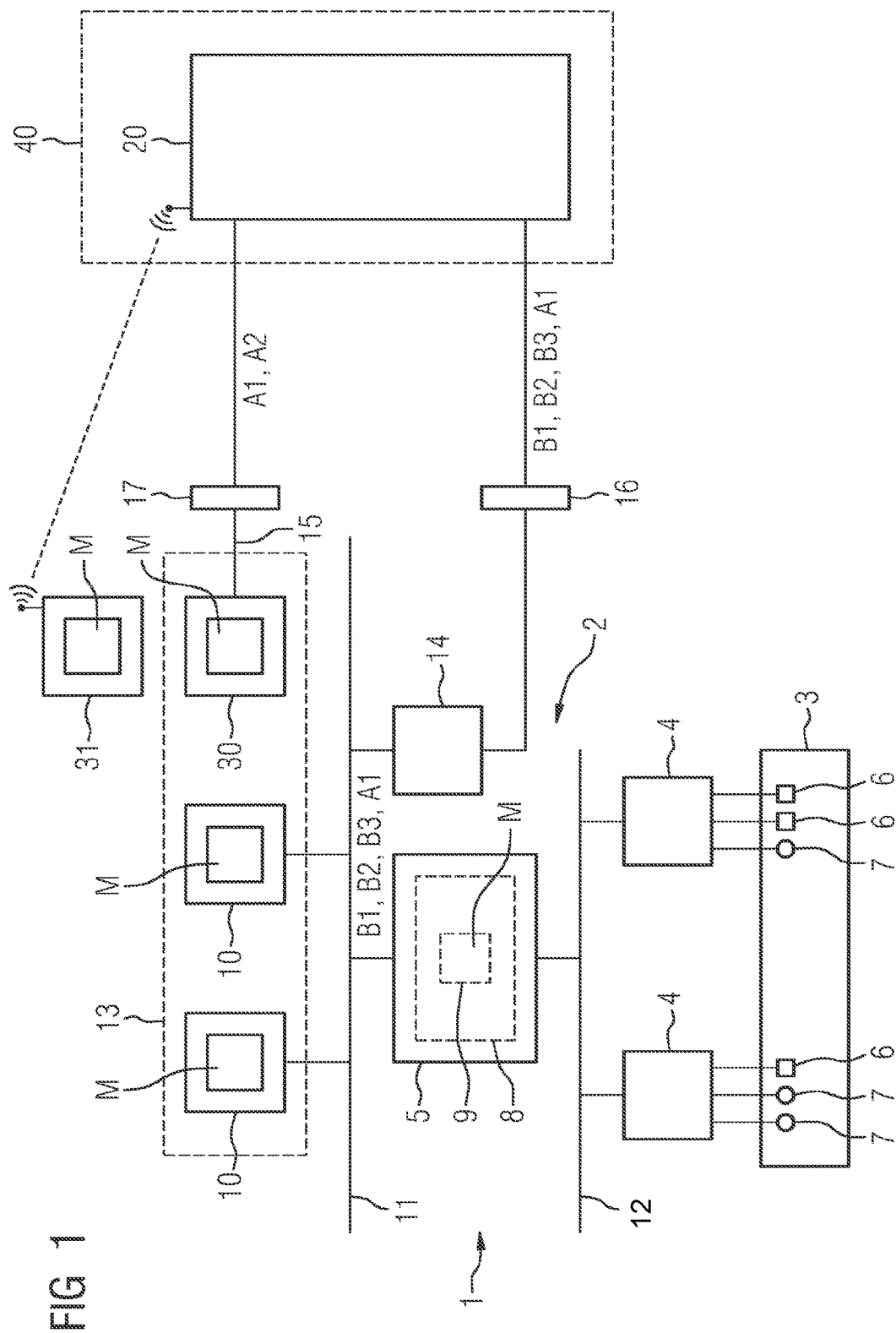
FIG. 1: shows a basic set-up of a system according to the invention in a simplified illustration.

FIG. 1 shows an industrial installation 1 with an automation system 2 in a simplified illustration. Such installations are used in a wide variety of industrial sectors, for example in energy generation, process industry (e.g. paper, chemicals, pharmaceuticals, metal, oil and gas) and discrete manufacturing industry. In this case, the actual sector-specific process 3, e.g. energy generation or production process, is controlled and/or regulated by the automation system 2. For this purpose, the automation system 2 comprises one or more industrial controllers (here the controllers 4) and at least one automation server 5.

Each of the controllers 4 then controls the operation of a respective subarea of the process 3 depending on the operating states thereof. For this purpose, the process 3 comprises actuators 6 that are controllable by the controllers. This can involve individual actuators (e.g. a motor, a pump, a valve, a switch), or groups of such actuators or entire sections of an installation. Furthermore, the process comprises sensors 7 that make actual values of process variables (e.g. temperatures, pressures, speeds) available to the controllers 4.

A communication network of the installation 1 comprises, at a superordinate level, a communication network 11, via which the automation server 5 is in communication with human-machine interfaces (HMI) 10, and a controller network 12 (often also referred to as "system network"), via which the controllers 4 are communicatively connected to one another and to the automation server 5. The controllers 4 can be connected to the actuators 6 and sensors 7 via discrete signal lines or via a field bus. The human-machine interfaces (HMI) 10 are usually embodied as an operating and observation station and arranged in a control room 13 of the installation 1.

The automation server 5 can be for example a so-called "operator system server" or "application server", in which one or more installation-specific application programs 8 are stored and executed during the operation of the installation 1. These serve for example to configure the controllers 4 in the installation 1, to detect and implement operator activities at the human-machine interfaces (HMI) 10 (e.g. to set or to change target values of process variables) or to generate reports for installation personnel and to display them on the human-machine interfaces (HMI) 10.

The automation system 2 without the field devices (i.e. without actuators 6 and sensors 7) is often also referred to as a "process control system".

In order to generate the reports M, the automation server 5 comprises a reporting system 9, which here is likewise realized by the application programs 8.

These reports M often relate to specific events in the automation system 2. A report can be for example an alarm report or an advice report. An alarm report is a report that a fault or an abnormal event has occurred and the personnel must initiate measures promptly. An advice report may advise of a need for maintenance, for example. In this case, the event report may comprise text and further information such as e.g. time and location of the generation of the report.

In order to direct the attention of the personnel to the reports that are important under defined or definable criteria or in order to predict said reports, the automation system additionally comprises a connection server 14, an evaluation system 20 and an additional human-machine interface 30, which is advantageously embodied as an operator station. Alternatively or supplementarily, a mobile human-machine interface 31, e.g. a smartphone, notebook or tablet, can also be present. In this case, the human-machine interfaces 30, 31 are disconnected from the communication network 11, i.e. it is not possible for the communication network 11 to communicate with the human-machine interfaces 30, 31, or vice versa. In particular, the human-machine interfaces 30 can be in communication with the evaluation system 20 via an office network 15.

Firewalls 16, 17 can also be arranged between the connection server 14 and the evaluation system 20 and between the evaluation system 20 and the human-machine interfaces 30, 31.

Figure 2:
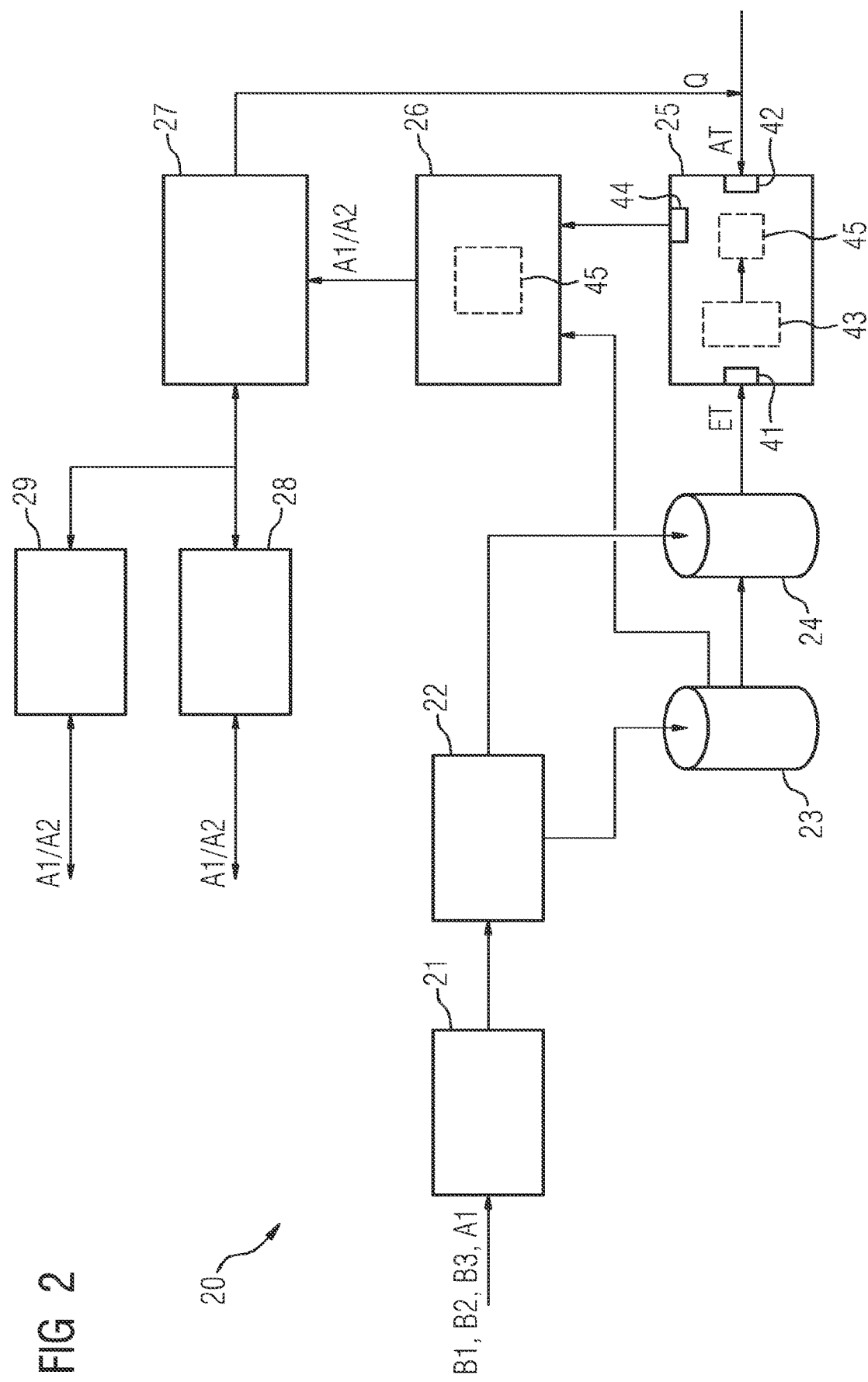
FIG. 2: shows the cloud-based evaluation system from FIG. 1 in a more detailed illustration.

As illustrated in detail in FIG. 2, the cloud-based evaluation system 20 comprises a first communication interface in the form of a cloud Internet gateway 21, a data stream processing unit 22, a storage unit 23 for actual data (real-time data), a storage unit 24 for historical data, a training unit 25, an evaluation unit 26, a web app 27, a second communication interface 28 for wired communication and, supplementarily or alternatively, a further second communication interface 29 for wireless communication.

In the reporting system 9, at least one first category A and a second category B of reports are defined and the reports of the automation system are each assigned to at least one of the two categories A, B.

Figure 3:
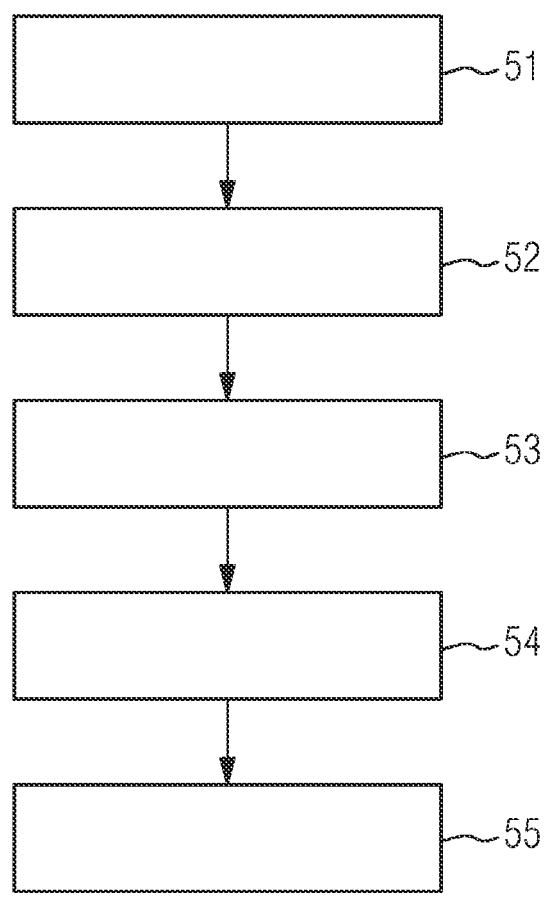
FIG. 3: shows a method sequence according to the invention.

During the operation of the automation system, a multiplicity of reports of type B (the data of which are designated here by B1, B2, B3, etc.) and a somewhat smaller number of type A (the data of which are designated here by A1, A2, etc.) are generated by the reporting system 9 and displayed on the human-machine interfaces 10 via the communication network 11 (see step 51 in FIG. 3). Moreover, data which represent these reports are transferred to the evaluation system 20 via the connection server 14 (see step 52 in FIG. 3). In this case, the cloud Internet gateway 21 is configured for receiving these data from the connection server 14 as transmitter.

The gateway 21 forwards these data to the data stream processing unit 22. The latter stores said data firstly for subsequent (almost) real-time processing in the storage unit 23 and also for archiving at the storage unit 24 (see step 53 in FIG. 3).

The data in the storage unit 23 are forwarded as input data to the evaluation unit 26 without a great delay.

The evaluation unit 26 is configured for applying a function to the input data, wherein the function was trained by an algorithm from the field of machine learning, and wherein output data, which represent a report of the automation system which is assigned to the first category A, are generated as a result (see step 54 in FIG. 3).

Firstly, the function trained by machine learning can be used beneficially for filtering reports of the first category from the total quantity of all reports (i.e. reports of the first and second categories). Here this is the report A1, for example. In this case, the output data represent one of the reports which is also already represented by the input data within a defined time period.

Secondly, machine learning can be used for predicting reports of the first category on the basis of at least the reports of the second category, optionally additionally also the reports of the first category. In this case, the output data generally represent a report which is not yet represented by the input data within a defined time period. However, they can also represent a report which is already represented by the input data within a defined period. Here this is the report A2, for example.

In both cases, the attention of personnel can be directed to the reports A1 or A2 that are important from defined standpoints or the occurrence of said reports can even be predicted in order to initiate countermeasures in a timely manner.

The output data A1 or A2 are transferred via the web app 27 either via the communication interface 28 to the human-machine interface 30 and/or via the communication interface 29 to the human-machine interface 31 and are displayed there (see step 55 in FIG. 3). The interfaces 28, 29 are thus configured for providing the output data to a receiver, which is different than the transmitter of the input data.

The report which is represented by the output data A1 or A2 is thus displayed in addition to all the other reports of the reporting system 9 in the control room 13. As a result of this report being displayed on the separate, additional second human-machine interface 30, 31, the attention of the personnel is directed particularly to these reports. As a result of the communicative disconnection of the second human-machine interface 30, 31 from the reporting system 9 or the automation system 2, it is possible to avoid undesired safety-relevant reactions affecting the automation system 2. In this case, moreover, intervention in the reporting system 9 is neither provided nor necessary.

For providing the trained function, the evaluation system comprises the training unit 25, which comprises:—a first training interface 41 configured for receiving input training data ET representing reports of the automation system 2,—a second training interface 42 configured for receiving output training data AT representing reports of the automation system 2, wherein the output training data are related to the input training data ET,—a training computing unit 43 configured for training the function 45 on the basis of the input training data ET and the output training data AT,—a third training interface 44, configured for providing the trained function 45 for the evaluation unit 26.

In this case, the input training data ET are received from the data storage unit 24. The output training data AT are received from experts. The training of the function 45 is based on the input training data ET and the output training data AT.

In the storage unit 24, training data which represent reports of other automation systems can also be acquired and used for the training of the function 45. The quality of the function 45 and thus of the output data can thereby be increased.

As a result of the training of the function 45 on the basis of training data, the function can adapt to new circumstances and identify and extrapolate patterns in the series of reports. Parameters of the functions can be adapted by training. By way of example, supervised training, semi-supervised training, unsupervised training, reinforcement learning and/or active training can be used in this case. Furthermore, representation learning (an alternative designation is "feature learning") can be used. In particular, the parameters of the function can be adapted iteratively by means of a plurality of training steps.

The function 45 is advantageously based on cross-correlation of reports, a neural network (advantageously long/short term memory—LSTM) or on association rules. A combination of these methods is advantageously used, wherein the result can be obtained e.g. by way of the sum of the results of all the methods, by way of majority results, by way of individual results, etc.

Information Q from personnel of the installation about a quality of the report which is represented by the output data can also be acquired by the second human-machine interface 30 or 31 and be transferred to the evaluation system 20 and used there for training the function 45. As a result the function 45 can be optimized particularly rapidly. The information Q can relate e.g. to whether a predicted report actually occurred and, in the case of occurrence, whether the specified time or the time period for its occurrence was predicted correctly.

Preferably, in the case of a prediction of a report which is represented by the output data A2, the output data comprise a point in time or a time period for an occurrence of the report and a probability of an occurrence of the report at said point in time or in said time period.

The different categories can advantageously express how critical the respective type of report is for the fail-safe reliability of the installation. However, the different categories can also relate to other aspects such as e.g. production costs, production quantity, production quality, consumption of raw materials, power consumption, emissions, etc.

Advantageously, a selection from a plurality of predefined categorizations is offered to personnel of the installation 1 via the second human-machine interface 30 and information about the selection can then be acquired via the second human-machine interface 30.

The invention claimed is:

1. A method for managing reports of an automation system, or an automation system of an industrial installation, wherein the automation system comprises a reporting system for generating reports and at least one first human-machine interface on which the reports are displayed, with the reports being alarm reports or advice reports, and wherein the reporting system is connected to the at least one first human-machine interface communicatively via a communication network of the automation system, the method comprising:
defining at least one first category of reports where the automation system requires immediate attention and a second category of reports where the automation system does not require immediate attention, with the first category of reports directed to the alarm reports and the second category of reports directed to the advice reports, and assigning each of the reports of the automation system to at least one of the two categories,
displaying the first and second category of reports on the at least one first human-machine interface communicatively connected to the reporting system,
applying a function at least to input data which represent reports which are assigned to the second category of reports and which are displayed on the at least one first human-machine interface, wherein the function was trained by an algorithm from the field of machine learning to filter out the first category of reports, and wherein output data, which represent a report of the automation system which is assigned to the first category of reports, are generated as a result, and
displaying the first category of reports which is represented by the output data on a second human-machine interface while not displaying the second category of reports on the second human-machine interface, wherein the second human-machine interface is communicatively disconnected from the reporting system that is displaying both the first and second category of reports on the at least one first human-machine interface,
wherein the output data acquired by the second human-machine interface is provided by an evaluation system that is separate from the reporting system and includes information about a quality of the first category of reports that is being used as feedback for training the function, with the information about the quality being provided from personnel of the industrial installation.

2. The method as claimed in claim 1,
wherein the input data of the function are received from a transmitter and wherein the output data of the function are transmitted to a receiver, which is different than the transmitter.

3. The method as claimed in claim 1,
wherein the function which was trained by an algorithm from the field of machine learning is trained by:
receiving input training data representing reports of the automation system,
receiving output training data representing reports of the automation system, wherein the output training data are related to the input training data,
training the function on the basis of the input training data and the output training data.

4. The method as claimed in claim 1,
wherein the function is arranged remotely from the reporting system and/or on a cloud-based computer system.

5. The method as claimed in claim 1,
wherein the function is further trained to predict reports of the first category on the basis of the second category of reports.

6. The method as claimed in claim 5,
wherein the information about the quality of the first category of reports includes whether a predicted report actually occurred.

7. The method as claimed in claim 6,
wherein in response to the predicted report actually occurring, the information about the quality of the first category of reports includes whether a specified time or a time period for its occurrence was predicted correctly.

8. An evaluation method for managing reports from a reporting system that generates the reports for an automation system or an automation system of an industrial installation, with the reports being alarm reports or advice reports, wherein at least one first category of reports is defined where the automation system requires immediate attention and a second category of reports is defined where the automation system does not require immediate attention, and wherein the reports of the automation system are each assigned to at least one of the two categories of reports, and wherein the first and second category of reports are displayed on at least one first human-machine interface communicatively coupled to the reporting system, the method comprising:
receiving input data from a transmitter, wherein the input data at least represent reports which are assigned to the second category of reports,
applying a function to the input data, which function was trained by an algorithm from the field of machine learning, wherein output data, which represent a report of the automation system which is assigned to the first category of reports, are generated as a result, and
providing the output data to a receiver that interfaces with a second human-machine interface that is communicatively disconnected from the reporting system that is displaying both the first and second category of reports on the at least one first human-machine interface, the second human-machine interface for displaying the first category of reports while not displaying the second category of reports, wherein the receiver is different than the transmitter,
wherein the output data acquired by the second human-machine interface includes information about a quality of the first category of reports that is being used as feedback for training the function, with the information about the quality being provided from personnel of the industrial installation.

9. The method as claimed in claim 8, wherein the function which was trained by an algorithm from the field of machine learning is trained by:
- receiving input training data representing reports of the automation system,
- receiving output training data representing reports of the automation system, wherein the output training data are related to the input training data,
- training the function on the basis of the input training data and the output training data.

10. A non-transitory computer-readable medium comprising
- instructions stored thereon which, when executed on a computer, cause the computer to carry out the method as claimed in claim 9.

11. A computer program stored on a non-transitory computer readable media comprising:
- instructions which, when the program is executed on a computer, cause the computer to carry out the method as claimed in claim 8.

12. A system for managing reports of an automation system or an automation system of an industrial installation, wherein the automation system comprises a reporting system for generating reports, and at least one first human-machine interface for displaying the reports, with the reports being alarm reports or advice reports, and wherein the reporting system is connected to the at least one first human-machine interface communicatively, via a communication network of the automation system, and wherein at least one first category of reports is defined where the automation system requires immediate attention and a second category of the reports of reports where the automation system does not require immediate attention, and wherein the reports of the automation system are each assigned to at least one of the two categories of reports and are displayed on the at least one first human-machine interface communicatively connected to the reporting system, the system comprising
- an evaluation unit configured for applying a function at least to input data which are displayed on the at least one first human-machine interface and which represent reports which are assigned to the second category, wherein the function was trained by an algorithm from the field of machine learning, and wherein output data, which represent a report of the automation system which is assigned to the first category, are generated as a result, and
- a second human-machine interface for displaying the first category of reports which is represented by the output data while not displaying the second category of reports, wherein the second human-machine interface is communicatively disconnected from the reporting system that is displaying both the first and second category of reports on the at least one first human-machine interface,
- wherein the output data acquired by the second human-machine interface includes information about a quality of the first category of reports that is being used as feedback for training the function, with the information about the quality being provided from personnel of the industrial installation.

13. The system as claimed in claim 12, comprising:
- a first interface configured for receiving the input data from a transmitter,
- a second interface configured for providing the output data to a receiver, which is different than the transmitter.

14. The system as claimed in claim 12, comprising:
- a training unit for providing the trained function, wherein the training unit comprises:
- a first training interface configured for receiving input training data representing reports of the automation system,
- a second training interface configured for receiving output training data representing reports of the automation system, wherein the output training data are related to the input training data,
- a training computing unit configured for training the function on the basis of the input training data and the output training data,
- a third training interface, configured for providing the trained function.

15. The system as claimed in claim 12,
- wherein the evaluation unit, and/or the training unit, is arranged remotely from the reporting system, and/or on a cloud-based computer system.

16. An evaluation system for managing reports from a reporting system for an automation system, wherein at least one first category of reports is defined where the automation system requires immediate attention and a second category of reports is defined where the automation system does not require immediate attention are displayed on at least one first human-machine interface, with the reports being alarm reports or advice reports, and wherein the reports of the automation system are each assigned to at least one of the two categories, the evaluation system comprising:
- an evaluation unit configured for applying a function at least to input data which represent reports which are assigned to the second category of reports, wherein the function was trained by an algorithm from the field of machine learning, and wherein output data, which represent a report of the automation system which is assigned to the first category of reports, are generated as a result,
- a first interface configured for receiving the input data from a transmitter, and
- a second interface configured for providing the output data to a receiver that interfaces with a second human-machine interface that is communicatively disconnected from the reporting system that is displaying both the first and second category of reports on the at least one first human-machine interface, the second human-machine interface for displaying the first category of reports while not displaying the second category of reports, wherein the transmitter is different than the receiver,
- wherein the output data acquired by the second human-machine interface includes information about a quality of the first category of reports that is being used as feedback for training the function, with the information about the quality being provided from personnel of the industrial installation.

17. The system as claimed in claim 16, comprising:
- a training unit for providing the trained function, wherein the training unit comprises:
- a first training interface configured for receiving input training data representing reports of the automation system,
- a second training interface configured for receiving output training data representing reports of the automation system, wherein the output training data are related to the input training data, a training computing unit configured for training the function on the basis of the input training data and the output training data, a third training interface configured for providing the trained function.

* * * * *